United States Patent [19]
Casali

[11] Patent Number: 5,651,422
[45] Date of Patent: Jul. 29, 1997

[54] UNIVERSAL-FIT, QUICK-CONNECT POWER DRIVE/STEER ATTACHMENT FOR WHEELCHAIR

[75] Inventor: John G. Casali, Blacksburg, Va.

[73] Assignee: The Center for Innovative Technology, Herndon, Va.

[21] Appl. No.: 479,407

[22] Filed: Jun. 7, 1995

Related U.S. Application Data

[63] Continuation-in-part of Ser. No. 231,060, Apr. 22, 1994, abandoned.

[51] Int. Cl.⁶ ................................................. B62M 7/14
[52] U.S. Cl. ............................................. 180/13; 180/907
[58] Field of Search .......................... 280/250.1, 304.1; 180/907, 11, 12, 13, 15, 16, 23, 65.1

[56] References Cited

U.S. PATENT DOCUMENTS

| 3,387,681 | 6/1968 | Rabjohn | 180/13 |
|---|---|---|---|
| 4,386,672 | 6/1983 | Coker | 180/13 |
| 5,222,567 | 6/1993 | Broadhead et al. | 180/15 |
| 5,244,051 | 9/1993 | Wu | 180/13 |
| 5,494,126 | 2/1996 | Meeker | 180/907 X |

FOREIGN PATENT DOCUMENTS

| 2061543 | 12/1970 | Norway | 180/907 X |
|---|---|---|---|

*Primary Examiner*—Brian L. Johnson
*Assistant Examiner*—Victor E. Johnson
*Attorney, Agent, or Firm*—Whitham, Curtis, Whitham & McGinn

[57] ABSTRACT

A power drive/steer attachment for a wheelchair having a framework supporting a plurality of front and rear wheels and a seat for accommodating an operator, is adapted for use with a motive source and includes a frame for attachment to and detachment from the framework of the wheelchair, a ground engaging mechanism, coupled to an end of a column, for driving the wheelchair by frictionally contacting a ground surface, a mechanism for driving the ground engaging means, and a mechanism, coupled to the second end of the frame, for controlling the driving mechanism and for steering the ground engaging mechanism to thereby steer the wheelchair.

17 Claims, 8 Drawing Sheets

UNIVERSAL-FIT, QUICK-CONNECT POWER DRIVE/STEER ATTACHMENT FOR WHEELCHAIR

CROSS-REFERENCES TO RELATED APPLICATIONS

This Application is a Continuation-In-Part Application of Ser. No. 08/231,060, filed on Apr. 22, 1994 now abandoned and for which priority is claimed herein.

BACKGROUND OF THE INVENTION

1. Field of the Invention

The present invention generally relates to a power assist drive/steer attachment for use on a folding wheelchair to convert the wheelchair into a motor-powered chair. The invention more particularly relates to an electric or fuel drive attachment for use on a wheelchair for persons having less than full use of their legs and which is steerable. In cases where the operator possesses sufficient motor capabilities, the invention may be easily attached by the operator while seated in the chair or from an external position.

2. Description of the Related Art

Power-driven wheelchairs are known and generally are one of three types. The first type of wheelchair is an integrated "power chair" in which a motive force producing means (e.g., produced by a battery or other power source) is permanently mounted to the chair. These types of chairs include a reinforced frame and are therefore extremely heavy (e.g., typically 220 pounds or more) and expensive (e.g., approximately $5000 or more). Further, the integrated "power chair" is typically extremely bulky and cannot be folded up, thus usually requiring a relatively large vehicle (e.g., a van) with a wheelchair lift to transport such a chair when the chair is not in use. Further, the integrated "power chair" typically is unable to be manually driven. Thus, if the motive force producing means is defective or non-operational, the user is unable to transport himself/herself at all by using the chair.

A second type of power-driven wheelchair is a standard folding-type chair with an auxiliary drive unit, typically electric-powered. This type of chair is much less expensive than the integrated "power chair", is foldable (if the drive unit can be-removed) and is relatively lightweight (e.g., typically less than 80 pounds), and in some cases can be manually driven by the operator with the aid of hand rims concentric with rear wheels of the wheelchair.

A third type of power-driven wheelchair recently placed on the market is a combination of the first two types of chairs. It is power-driven (usually electric), but it can be folded up for transportation. This is accomplished by removing the power supply and in some cases the drive unit when folding is required. These chairs do not have a reinforced frame and are therefore comparable in weight with auxiliary drive chairs. Many are available for about $4000 (still expensive relative to an add-on unit). However, there are many drawbacks to these new power chairs and the conventional auxiliary drive units.

The conventional auxiliary drive units and the foldable power-driven wheelchairs are of various designs, and depending on the design, there are various problems which greatly limit performance. Of the power assist devices, many cannot be used to power the wheelchair over or onto obstacles such as over curbs or to descend from the pavement to a road in a controlled manner (i.e., as opposed to dropping thereto). Further, several of the available conventional power attachment units do not allow for steering of the wheelchair and are typically inaccessible to the operator seated in the wheelchair.

Additional problems presented by some of the conventional drive units and the foldable power chair include the lack of provisions for an operator to conveniently attach and detach the power unit and device (the requirement of an assistant in many cases), dangerous positioning of moveable parts which may injure body parts or damage clothes, inability to switch between manual and power modes, and application such that overall wheelchair stability is decreased.

There is a need for manual wheelchair users to have occasional access to a power-driven wheelchair. This is because operating a manually-driven wheelchair requires continuous activity of the user's arms and hands with substantial muscle exertion, and thus the physical effort to power such chairs is great and significantly limits the operator's mobility and endurance.

An example of a conventional power assist device is disclosed, for example, in U.S. Pat. No. 5,016,720 to Coker, in which a detachable electric drive unit for a collapsible wheelchair has a drive unit which is battery-powered. The drive unit is steerable via a steering column, which is rotatable around its vertical axis by pushing on a handlebar, and the drive unit is mounted between the user's legs in front of the wheelchair. However, such a power assist attachment has several problems.

First, the drive unit trails beneath a sling seat of the wheelchair. Thus, while the unit includes portions which are attached to the front of the wheelchair, the attachment must also be coupled to an X-shaped brace underneath the seat. This makes it extremely difficult, if not impossible, for the operator to easily and efficiently attach, detach, and access the drive unit. It also precludes the possibility of folding the chair with the unit mounted. Further, the steering column is connected by a linkage to a drive wheel, rather than directly. This configuration makes for a complex steering mechanism and precludes the possibility of 360-degree rotation of the drive wheel.

Additionally, the drive wheel is not reliably positioned or located as it traverses a straight line or in a straight direction since it is not guided by any type of mechanism. As a result, the operator must exert continuous control and pressure on the steering column to ensure that the wheelchair travels in the intended direction. This constant vigilance and control of the steering column is tedious and easily tires the operator. It is also the only drive mode available while the unit is attached. Them is no provision for switching into a manual driving mode with the device in place. Further, a flat spring provides suspension by supporting an entire fork, and ground clearance is minimal due to possible interference with low slung frame members and a fender.

Another conventional wheelchair attachment is disclosed, for example, in U.S. Pat. No. 5,113,959 to Mastov, in which a rear-mounted electric drive attachment for a wheelchair includes an electric motor and a wheel, coupled to the electric motor, for driving the wheelchair by frictionally contacting the ground. A bracket arrangement allows the wheel to be inclined to a plurality of different positions to allow the chair to negotiate curbs and obstacles; however, the advocated practice of having the operator perform a "wheelie" with the chair to climb curbs is potentially very dangerous.

This conventional design also suffers from other various drawbacks. For example, the attachment is not designed to be removed once fitted to the chair. There is no spring or other device to produce down force on the drive wheel to maintain traction, just gravity. Furthermore, there is no steering capability of the chair with the attachment.

In view of the foregoing, the conventional attachment systems have a plurality of drawbacks which make them difficult for attachment and use by the operator of the wheelchair, and preclude their attachment by an operator while seated in the chair.

SUMMARY OF THE INVENTION

It is therefore an object of the present invention to provide a power drive/steer attachment for use with a standard folding-type wheelchair so as to convert the wheelchair into a power-driven chair and in which the attachment is attachable by an operator having sufficient upper body capabilities and is positioned so as to be easily manipulable, and in which the attachment enables the wheelchair to be easily steerable and has the steering column directly linked to the drive wheel (i.e., without the need for an intermediate linkage).

In a first aspect of the invention, a power attachment for a wheelchair having a framework supporting a plurality of front and rear wheels and a seat for accommodating an operator, the attachment adapted for use with an electric motor powered by a battery or batteries or alternatively a fueled motor, and including a frame for attachment to and detachment from the framework of the wheelchair, the frame having first and second ends, ground engaging means, coupled to the first end of the frame, for driving the wheelchair by frictionally contacting a ground surface, means for driving the ground engaging means, and means, coupled to the second end of the frame, for controlling the driving means and for steering of the ground engaging means to thereby steer the wheelchair.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
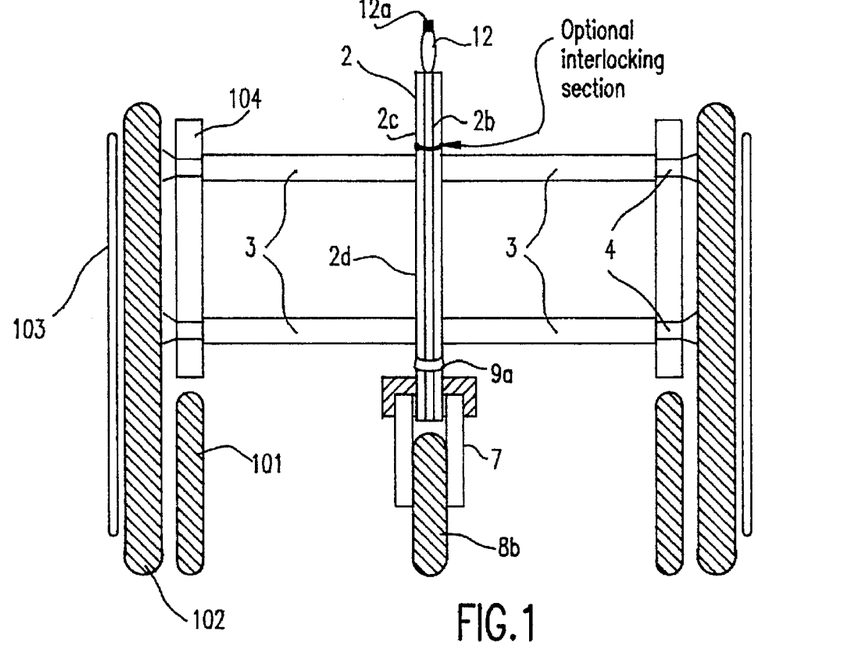
FIG. 1 is a front view of the drive attachment for a wheelchair according to the invention.
Figures 2, 3:
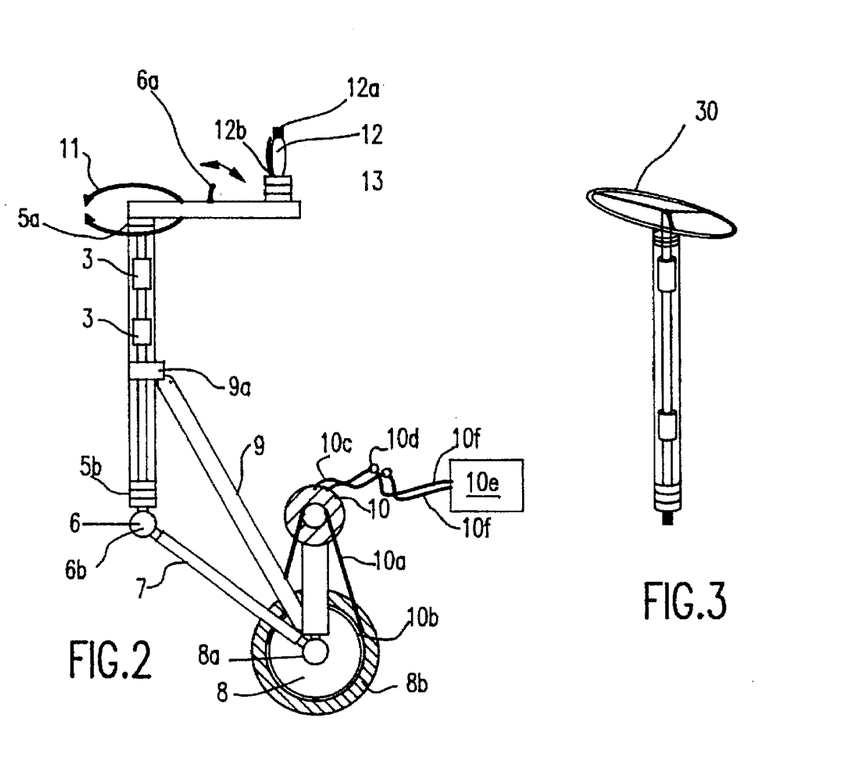
FIG. 2 is a side view of the drive attachment, using an electric motor example for illustration, for a wheelchair shown in FIG. 1 along line II—II.
FIG. 3 is a side view of an alternative steering mechanism for use with the drive attachment according to the invention shown in FIG. 1.

Referring now to the drawings, and more particularly to FIGS. 1 and 2, there is shown a power drive/steer attachment 1 for use with a standard folding-type wheelchair in accordance with a first embodiment of the invention. The wheelchair, as shown, generally includes relatively small, pivotable front wheels 101, relatively large, fixed rear wheels 102 and circular rims 103 which are concentrically positioned with respect to the rear wheels 102, for manually powering the wheelchair and a wheelchair frame 104. The wheelchair also includes a sling seat (not illustrated) and a backrest (not illustrated) for accommodating the operator and which are made of a suitable material for allowing the wheelchair to be folded in a manner known in the art.

Generally, the power drive/steer attachment is designed to fit vertically in front of the sling seat of the wheelchair between the legs of the operator. By mounting the attachment in front of the operator, the attachment can be easily manipulated and controlled. Further, assembly and disassembly by the operator are made faster and easier with such positioning. The attachment 1 is removable in its entirety from the wheelchair, except in the case on some wheelchairs where mounting brackets, which do not interfere with manual wheelchair operation, are best left attached. Typically, no components of the attachment, except for the possibility of mounting brackets, need to be left on the wheelchair after removal of the attachment. Thus, the attachment represents a self-contained package in which no permanent components that limit the operation of the chair as a manual unit are required to be left on the chair for assembly of the attachment.

The attachment includes means for enabling the unit to fit conventional wheelchairs which have similar construction but which may differ in size and to positively but releasably lock the unit securely to the wheelchair. Such means will typically include adjustable (extendable/retractable) frame components allowing both vertical and horizontal size compatibility, and it is envisioned that other mechanical adjustment means may be adapted for special fitting needs.

The attachment 1 includes a central, vertical (i.e., upright) tube 2 which is vertical and centered between with side uprights (unreferenced) of the wheelchair frame 104 and which includes first and second concentric tube portions 2a, 2b. Tube 2 preferably is formed of a lightweight metal material such as an aluminum alloy, magnesium, or similar, or a composite nonmetallic material, such as carbon graphite or glass fiber-striated polymer. The particular lightweight material is selected to provide the necessary strength of materials for the attachment and yet is light enough for the operator to easily lift and position in place, either while seated in the chair or at a location external to the chair.

At least one tube or crossbar 3, which are horizontal (i.e., generally parallel to a ground surface upon which the wheelchair traverses and perpendicular to the longitudinal axis of central tube 2), extend outwardly from the central tube 2 and preferably are comprised of the same materials as tube 2 or the like. Tubes 3 attach to the wheelchair frame with quick-connection means 4, or if a temporary mount is not desired, with permanent fasteners. Quick-connect means 4 preferably comprises a curved wheelchair frame interface clamp which expands to allow the attachment to be positioned in place and then is either manually tightened around the frame or is snap-locked into place.

Means 4 is operated by aligning the curved ends of the attachment frame with the corresponding curved surfaces of the wheelchair frame and compressing the pieces by way of a locking lever, a wingnut-type control, or the like.

Other means for establishing means 4 are envisioned, such as pin locks which are placed in pre-drilled holes in the wheelchair frame, U-bolt clamps, set-screws, or spring-loaded tubes 3 which extend and are aligned and held into place with a pin on each outboard end which fits through the frame 4 or via a clamp that grabs the frame. Quick-connect means 4 not only provides quick connection of the attachment but also provides quick-release for removal of the attachment or for the operator to exit the chair.

As an optional, alternative means to exiting the chair that obviates the need to remove the drive unit, tube 2 is formed to have at least one removable portion. For example, the center tubes 2 can be formed by a plurality (e.g., two) interlocking sections 2c and 2d which mate the motor and steering control connections when fitted together. A top portion of the tube is removable by pulling upwardly and separating the top half of the tube from a bottom half at a point just under the sling seat, affording an unobstructed path out of the front of the chair. With the center tube portions in place, an advantage afforded by the device is that the attachment will serve to partially block the operator from being thrown from the chair in the event of a collision or the like.

The outermost tube portion 2a of the center tube 2 is rigidly attached to the horizontal frame tubes 3 by suitable fastening means such as by welding or a more temporary hinge, tube interlock, or fastener arrangement which allows the unit to be folded or separated at the tube junctions. The inner tube portion 2b of the center tube 2 is connected at a first end (i.e., the bottom) to a fork hinge 6 (see FIG. 2) via a bearing 5b or the like and at a second end (i.e., the top) to a control mechanism 12 via a bearing 5a or the like, both the control mechanism and the fork hinge being discussed in further detail below. Preferably, there are at least two sets of tubes 3 on each side of the central tube 2 which preferably provide at least two points of attachment for the device 2 to the wheelchair frame on each side, so as to provide strength and rigidity of the attachment.

As an alternative to the structure above, with particularly rigid tube materials and frame connections, and/or with corner bracing at the tube joints, it is envisioned that only one horizontal tube 3 may be needed on either side of the center tube 2.

An additional option is envisioned for the attachment frame which utilizes the concept of a cross-brace similar to the folding central section of the manual wheelchair. Two tubes, rotating about a shared axis through the center point of each tube, form a cross-frame between the left and right sides of the wheelchair frame. In this case four points of contact remain between the two frames and adjustability is only required in one direction (i.e., along the lengths of the two tubes).

At the bottom of the central tube 2, a first end of a fork 7, either having a "monofork" (single support on one side of wheel) or a conventional double fork (surrounding wheel) design, is hinged to the central tube 2 via a hinge 6. A second end of the fork 7 is coupled to an axle 8a which mounts a drive wheel or wheels 8. The fork 7 serves as a trailing arm to locate and position the drive wheel behind the central upright tube 2 and underneath the wheelchair seat (not illustrated). The trailing arm fork 7 locates the drive wheel safely away from the user's feet and out of the way under the seat and provides straight-line tracking (i.e., a self-centering effect) on a smooth surface with hands-off steering control. Thus, the operator is not required to exert continuous pressure on the steering control mechanism when traveling in a straight line or direction.

A spring-loading mechanism 9, which preferably is a steel coil type but which alternatively can comprise steel or composite leaf, gas pressure, elastomeric, rubber, or other design, is placed in compression and coupled to a portion of the central tube 2 via a fixture such as a collar 9a which is coupled to and adapted to turn on the outermost tube portion 2a of the central tube 2. The collar is fitted to the outermost tube portion of the central tube 2 and is locatable at different points along the length of the central tube 2. The compression spring 9 is coupled between the drive wheel end of the fork 7 and the central tube 2.

The spring 9 is connected to the fork 7 at the lower end and the central tube collar 9a at the upper end in spring mounting blocks (not illustrated), which are bolted or welded directly onto the fork 7 and collar 9a. Alternatively to the spring 9, a torsion steel spring or elastomeric or rubber spring (not illustrated) can be used at the hinge 6, becoming compressed when the hinge moves toward closure.

As an additional option, a tension spring could be employed to apply a downward force on the drive wheel mechanism. In this case the lower spring end can be mounted on the underside of the trailing fork while the spring wraps around the lower end of central tube 2 to couple to the front of the apparatus at collar 9a.

The hinge 6 can be lowered into a "drive" position where the drive wheel 8 is engaged with the ground surface or raised and locked into a "transport" (i.e., up) position where the chair can be manually maneuvered by the seated operator or pushed by an attendant, in both cases without interference from the power assist unit. The transport position holds/biases the spring-loaded fork 7 at an angle which permits the assembly to be positioned under the wheelchair without having the drive wheel 8 touch the ground. In its drive position, the hinge 6 is in a floating configuration. The spring-loaded fork provides a range of vertical motion to keep the drive wheel on the ground at all times, even over rough or uneven terrain.

Achieving the "drive" or "transport" hinge positions can be determined by a variety of controls and mechanical linkages to accommodate the user's specific capabilities. For example, the unit could be attached with the drive wheel locked in the transport position. Once attached, the seated operator can pull a small lever 6a which moves a catch 6b that releases the spring, which then pushes the fork downward, achieving the drive position.

As briefly mentioned above, the trailing arm assembly provided by the fork 7 and spring assembly positions the drive unit to tend toward straight-ahead motion on even surfaces, such as tile floors or the like, without requiring the user to have constant force and corrective action on the steering control mechanism. Different motor speeds and horsepower, as well as drive wheel size and drive pulley size may be advantageously selected so that wheelchair speed and climbing ability can be adjusted to suit the user's specific needs and the terrain to be traversed. Also, depending on these needs, the motor drive can be configured by various electromechanical or mechanical means conventional to those skilled in the art to achieve single or multiple discrete speeds or alternatively, a continuous range of speeds.

A mechanism for powering the drive wheel 8 is mounted thereabove, preferably on the fork assembly 7 or alternatively on the frame tubes 2 and/or 3. By locating the weight of the power mechanism above the wheel 8 on the fork 7, an additional downward force (i.e., additional to the force produced by the spring) on the drive wheel and a tire 8b mounted thereon is provided so that the drive wheel and tire affirmatively contact the ground surface even if traversing rough or uneven terrain. The tire 8b preferably comprises a pneumatic or compliant semi-pneumatic tire inflated to a suitable pressure and which serves to absorb shock and the like due to ground terrain inconsistencies and objects over which the chair traverses. Such a tire is advantageous over other wheel assemblies which are formed of molded plastic or hardened rubber compounds and which do not absorb shock and which do not necessarily maintain contact with the ground surface. However, if the attendant advantages of a pneumatic tire are not needed (e.g., if the chair is confined to use on the smooth tile floors of a department store), alternative, less compliant tires may be substituted. It is also envisioned in some situations that two drive wheels may be more advantageous than one. In this alternative the wheels share a common axis, adding a frictional advantage over a single narrow wheel, and a turning advantage over a single wide wheel.

The powering mechanism preferably comprises a high torque DC motor 10, or alternatively a propane or other fueled motor, which is mounted to the axle of the drive wheel 8a, the fork 7, or the frame 2,3 via a motor mount frame which is preferably adjustable for the purpose of tensioning the V-belt 10a drive, if such a drive mechanism is used. The powertrain assembly is suitably attached to the drive wheel.

The powertrain assembly preferably includes a continuous V-belt drive 10a or the like coupled to a reduction pulley 10b attached to the drive wheel 8. The powertrain, of course, may take any form so long as the drive wheel is powered thereby, including, but not limited to an endless chain powertrain with drive sprocket on the motor shaft and driven sprocket substituting for the pulley 8a, a direct drive coupling with the motor shaft attached collinear with the drive wheel axle 8a, a friction drive with a motor shaft-mounted friction drive roller which is pressed against the drive wheel 8 to power it through frictional contact therewith, an annular gear drive which incorporates a motor shaft-mounted pinion fitting inside a wheel-mounted internal gear (this drivetrain has the advantage of being quite compact), or a gearbox comprising a motor shaft-mounted drive gear meshed with a wheel or axle mounted driven gear substituting for the pulley 8a. All four wheels of the wheelchair remain on or very close to the ground surface while being powered by the drive wheel.

In the case where a DC motor is used for power, leads 10c from the motor are preferably coupled, via spring clips 10d or the like, to positive and negative terminals 10f of a storage battery or batteries 10e. Preferably, the power source is comprised of two twelve volt gel-type, nickel-cadmium, lead acid batteries or the like. The type, size, and power capacity of the battery(ies) is preferably selected based upon operator usage and recharging availability, as well as operator capability in lifting and positioning the batteries.

In operation, the DC motor is energized (after actuation by a control mechanism discussed below) by the energy stored in the battery(ies), and power is transferred from the battery(ies) to the DC motor to the V-belt drive (or alternative powertrain) to turn the drive wheel, thereby to power the wheelchair. If a friction drive roller is employed, the DC motor energizes the friction drive roller to frictionally engage the wheel 8 and energize the wheelchair.

A horizontal tube, bar or other structural member 11, substantially perpendicular to the longitudinal axis of the central tube 2, has a first end coupled to a second, i.e., top, end of the central tube 2 via a bearing 5a and extends rearwardly towards the operator seated in the wheelchair.

At a second end of the tube 11, suitable means 12 for manually controlling the power drive/steer attachment is positioned preferably via a bearing 13, slip-ring or alternative mechanism through which an electrical or mechanical linkage connection can be made for control of the power unit. Means 12 operates the steering of the wheelchair by steering the drive wheel and controls the actuation of the power drive/steer attachment by the operator, as discussed below.

Preferably, in the most fundamental embodiment, the controls include a basic vertical tiller handgrip 12 which spins (i.e., rotates) on the bearing 13. The operator steers the drive wheel (and thus the chair) by moving the tiller in a predetermined direction (i.e., in an arc path towards the operator's left and right sides). Moving the tiller in a predetermined direction simultaneously moves, i.e., pivots, the drive wheel in the predetermined direction. The chair may be moved rearwardly by several alternative means which are conventional to those skilled in the art, including reversing the motor direction with a switch control on the means 12, using a gear reverse (not illustrated) incorporated as part of the powertrain, using a lever attached to a pulley (not illustrated) to apply tensioning to a second V-belt mounted in a figure-8 pattern which connects the motor shaft pulley to the drive wheel pulley 10b, or by incorporating means to allow the tiller handgrip 12 and tube 11 assembly to rotate 180 degrees Θ away from the resting position (where the tiller handle is nearest the operator's abdomen), causing the drive wheel to push the chair backward, or to turn it in its own length at the 90 degree position.

The configuration of the means (i.e., tiller) 12 is designed for an operator having adequate hand/arm skills and strength. Alternatively, handlebars may be used for the steering mechanism. Another alternative configuration is to use a steering wheel 30 fitted to the central tube 2 via a bearing or other sliding fixture, as shown in FIG. 3. The steering wheel is attached to a hub which is affixed, by permanent (e.g., weld) or removable fastener (e.g., key and keyway) connection, onto the inner tube 2b to serve as a steering column that is in direct connection with the drive wheel assembly.

Figure 13:
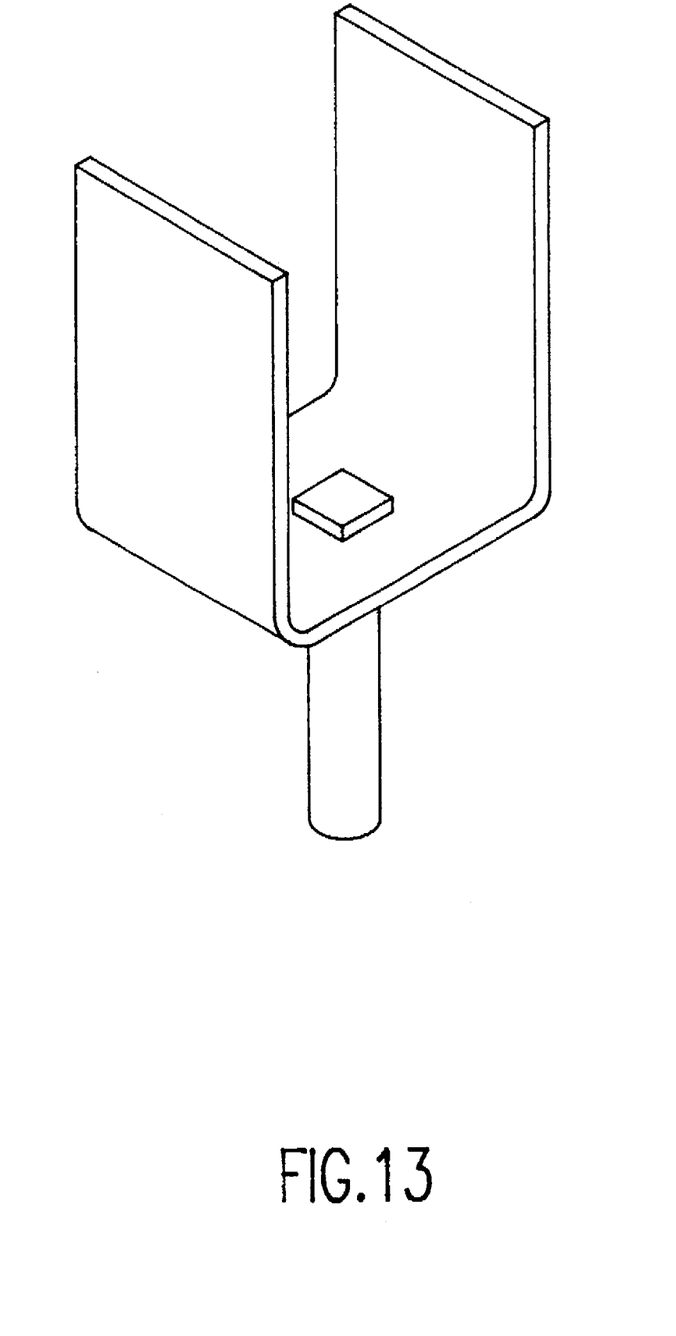
FIG. 13 is a view of a forked swivel steering post according to the invention.

As an alternative to the handgrip, it is envisioned that a wrist-engaging mechanism (as shown in FIG. 13) could be substituted for operators without sufficient hand gripping abilities. Such a mechanism could comprise vertical forked prongs, attached to bearing 13 whereby the operator can drop his or her wrist between the prongs and rotate the tiller by way of arm motion.

For users having a more limited hand/arm function, such as a quadriplegic or the like, special electronic controls such as isometric joysticks having a power assist (a separate motor from the drive motor) to turn the steering column, can be easily adapted. As is evident, the steering mechanism will rely on an assessment of the individual operator's capabilities. However, the tiller or handlebar arrangement represent the simplest and most preferred configurations since the need for electronic hand controls such as a joystick, and/or complex two-motor drive systems to power the large rear wheels differentially to provide directional control, is obviated.

In one simple embodiment for the manual motor controls, the control mechanism includes a push-button 12a slidably moved to first and second positions for selectively actuating the motor 10 (and thus the chair) in forward and reverse directions. The switch types and switch positions for controlling operation of the motor will necessarily depend on the operator's needs. For example, if the operator possesses only thumb flexion abilities, the switch 12a could be pressed once to achieve forward and pressed again to achieve reverse. If the operator has no finger/thumb psychomotor control, a two-position toggle switch (or other similar switch with a bat handle or rocker arrangement) could be used so that the hand can push the switch away from the body for forward direction and pull it back for reverse direction.

As discussed above, with an electric motor as the power source, reverse is most simply provided by reversing the electric drive motor, which can easily be achieved with a simple switch. Alternatively, reverse is provided, as stated above, by simply turning the steering handle 180 degrees.

Additionally, a lever handle 12b, coupled to the tiller and configured to be squeezed by the operator, is a preferred control for transmitting a signal for activation of power to the drive wheel. In the case of the DC motor power drive, squeezing the lever closes the circuit with the DC motor and the battery(ies) and thus actuates the DC motor coupled to the storage battery(ies). Depending on the user's functional capabilities, non-locking push-button, joystick, rocker switch, toggle switch, compressible tiller handle 12, or other control types may be adapted.

For some users, it may be desirable to configure the tiller handle 12 such that it rotates (tilts) fore and aft around a horizontal axis passing through or just above the bearing 13 to activate motor directional control, in addition to rotating about the vertical axis passing through the handle 12 and bearing 13 to allow spinning of the handle when the tiller is turned for steering. For modulation of speed, both infinite controls, such as variable resistance rheostats for the DC motor or throttle positioners for fueled motors, or discrete state controls, such as simple on-off or multi-position, selectable resistance switches, can be used.

To alleviate the need for constant pressure on the control to maintain constant speed, for some users it is feasible to provide a speed control position lock which holds a selected "cruise-control" position until overridden. It is preferable with the motion controls to have the control return to a null or off position automatically when released. Then, the chair would quickly come to a resting position due to lack of power to the motor, or an auxiliary braking system would be automatically invoked. Wiring for me power controls is routed through the hollow tubing of the center tube 2 or externally to the frame to the drive motor.

The preferred embodiment of the device, except for the battery(ies) or fuel storage, is entirely self-contained as an upright center-post frame design, with steering and motor control mechanism at the top of the post and the power head and drive wheel at the bottom. Because the post doubles as a steering column, the drive components and the steering components are integrated into a single unit, which affords simple pivoting steering. The drive wheel pivots at the same angle as the steering handle since they are coupled directly together via the center tube 2b.

In an example of drive/steer operation, if the operator wishes to move the chair towards the left he/she rotates the tiller counterclockwise to the right and simultaneously squeezes the power activation control to actuate the motor and powertrain assembly to thereby drive the wheel. Directional control is achieved by motor torque and the chair is "pulled" in the desired direction. Such a feature avoids the sideslip skidding that occurs when cornering forces overcome the traction of a non-powered wheel used for steering, (e.g., the front wheelchair caster that is steerable in some designs).

In the preferred configuration, the outermost tube portion 2a of the central upright tube 2 is fixed, whereas the inner tube portion 2b thereof is supported on bearings and is configured to turn.

In one example of a usage scenario for the above-described wheelchair, the operator removes the wheelchair from the rear seat of an automobile and completely unfolds the wheelchair. With an electric-powered version, the operator places the batteries in a box or sling holder(not illustrated) which is affixed underneath the seat, behind the seat, or in another suitable location within easy reach of the operator. Thereafter, the operator transfers himself/herself to the seat of the wheelchair and attaches in turn the quick-connect fittings to the upper and bottom sides of the first and second uprights of the wheelchair frame. Alternatively, the unit may be attached prior to the operator's transfer to the wheelchair with the top portion of the optional two-piece central tube 2 removed.

Then, the leads from the high-torque DC motor are connected to the respective positive and negative terminals of the batteries via quick-connect clips, such as the spring-loaded clamps used on jumper cables. Alternatively, in a fuel-powered version, the operator uses a snap-connect hose fitting to connect the fuel line to the motor with the on-board fuel storage tank. Otherwise, a small tank can be made as an integral part of the unit itself. The power attachment is then ready for use by the operator.

To remove the attachment according to the invention, the above sequence is reversed.

The process of attaching or removing the power drive/steer attachment according to the invention is expected to be performed in less than approximately five minutes, but of course will vary depending on the operator's or attendant's capabilities.

The power drive/steer attachment according to the invention can be easily retrofitted to existing conventional folding wheelchairs through the quick-connect means and can be easily fitted to the chair by the operator thereof (given adequate upper body strength and mobility). Thus, the power attachment allows users to change a standard folding-type wheelchair into a power chair without permanently modifying their existing chair in a functional sense or defeating its capability of being used as a manual, folding chair.

Further, the attachment can be mounted simply, without tools, and in a short period and is easily stored with the chair in a backseat or a front passenger seat or floorboard of an automobile where it is readily accessible to a wheelchair driver. Its lightweight and simple construction allows a wheelchair operator to remove the wheelchair from the automobile, unfold the chair, and attach the power drive/steer attachment. Such a system having the above-described features allows mobility and independence to the wheelchair operator which was not available to them hitherto the invention with currently available power chairs or prior art conventional power assist attachment devices for attachment to standard folding-type wheelchairs.

Furthermore, the structure according to the invention does not require a linkage between the steering column and drive wheel frame, as in the conventional systems. Moreover, the attachment according to the present invention provides a direct connection between the steering column and drive wheel frame. Additionally, the present invention can be configured to allow for 360-degree steering by reversal of the filler. Such a feature is not provided in prior designs.

Further, the integral design of a drive wheel at one end of a post (i.e., central tube) and a controller at a second end thereof allows such a unit to be compact and allows for storage on the front passenger seat or passenger floorboard of a car.

The attachment's construction is also simple, can be manufactured of lightweight materials, and attaches to the front of the chair, all so that a wheelchair user can attach it independently. An operator with sufficient strength and upper body mobility can lean slightly forward in the chair, position the unit between his/her knees, and make the attachment of the drive/steer unit to the front frame of the chair. The operator's mobility and independence are dramatically increased over that when using the conventional wheelchair attachments.

Further, the drive wheel is mounted on the end of the central tube via a trailing arm fork which is hinged at the lower potion of the tube. When the steering handle is positioned for forward movement, the drive wheel "trails" behind the post and thus the drive wheel is located under the seat. This is advantageous in that power is applied at or very near the center of gravity of the chair and its operator load, thereby providing greater traction and control. Avoiding powering the large rear wheels or applying forward forces toward the rear or behind the chair greatly reduces the possibility of the chair flipping over backward or the occurrence of "wheelies".

"Wheelies" is a term commonly known in the art and refers to a reaction phenomenon produced by a sudden and forceful application of a forward drive force to the rims of the rear wheel. Due to the inertia of the masses involved, the wheelchair can be made to tip backwards by way of reactive force, lifting the front wheels off the ground.

Such a phenomenon is further inhibited through the use of the drive/steer unit by the addition of the weight of the device at its attachment point on the front frame of the chair. Stability of the wheelchair is also preserved by maintaining contact or near contact between all wheelchair wheels and the ground while the drive/steer device is in use. This security is minimized by other attachment devices which require that the front caster wheels of the wheelchair be lifted off the ground while driving.

Additionally, in the most common position (for forward translation), the drive wheel is located safely out of the way under the seat, instead of being in a position where it may be hazardous for running over pedestrians' feet, if mounted to the side, or creating a finger/hand pinch-point or clothing catch hazard, if mounted toward the top of the rear wheels as a friction drive. Furthermore, the positive caster drive wheel mounting alleviates asymmetrical drive forces that occur with dual-wheel (i.e., separately powered wheels) drive systems. It also has the added benefit of straight-line tracking and a self-centering tendency on a smooth surface (which does not have lateral slope) with hands off of the steering control.

The hinged trailing fork which is one method of locating the drive wheel is designed to latch into at least two positions: a "transport" or up location, in which the wheel does not touch the ground, designed to allow the chair to be pushed or hand-wheeled, and a "drive" or down location, in which the drive wheel is held in compression against the ground surface by a spring which lies between the fork and the central tube. This design is significantly different from the drive arrangements on conventional front-mount systems in that the spring and hinged fork combination of the invention keeps the drive wheel firmly against the ground surface even over moderately rough terrain. With proper component parameter specification (e.g., drive wheel diameter, motor torque selection, fork angle, etc.), the trailing fork design is able to negotiate low curbs and other short obstacles, avoiding the conventional complex front- and rear-mounted mechanisms designed solely for this purpose.

Furthermore, because there is only a single drive wheel (or dual wheels located adjacent each other) and because it can be located via a trailing fork of sharp rake (i.e., high angle of approach) that will avoid ground contact, the power drive/steer device does not significantly compromise the ground clearance of the wheelchair. Also, the location of these components does not cause the wheelchair's dimensions to be widened or lengthened, thereby providing mobility access through doorways and the like. The up and down positioning of the drive unit can be easily manually selected through the use of a variety of options involving simple controls and mechanical linkages that depend upon the user's specific capabilities.

While the above-described power attachment has been described as being removed before folding up the standard folding-type wheelchair, an alternative embodiment of the attachment can be configured to enable folding of the wheelchair without detachment of the device. Specifically, gimbaled frame connectors or the like that provide joints at both ends of the horizontal frame tubes 3 may be employed to enable the wheelchair to be folded (along with the device) with the device connected to the wheelchair frame.

In this embodiment, the drive unit would be detached from the fuel or battery source and pulled forward, downward, or upward away from the front of the chair. It would remain in this position while the chair is folded. Such a feature is important for operators using the attachment often but not frequently needing to remove the device.

Thus, while the drive/steer attachment described above as a rigid (i.e., non-folding) design is intended primarily for only ease of attachment/detachment to and from the wheelchair, there may be cases where permanent attachment of the device to the front frame of the wheelchair is desirable and where the folding capability of the chair is maintained. If the latter is the case, the jointed frame connectors can be used.

The foregoing embodiment represented in FIGS. 1–3, with all alternative and optional features discussed above, shall be summarily referred herein to as a first preferred embodiment.

A second preferred embodiment is represented in FIGS. 4–12 and incorporates many of the features of the first embodiment, discussed above. In addition, or in the alternative to the first embodiment, as the case may be, the second embodiment includes the following features.

Figure 4:
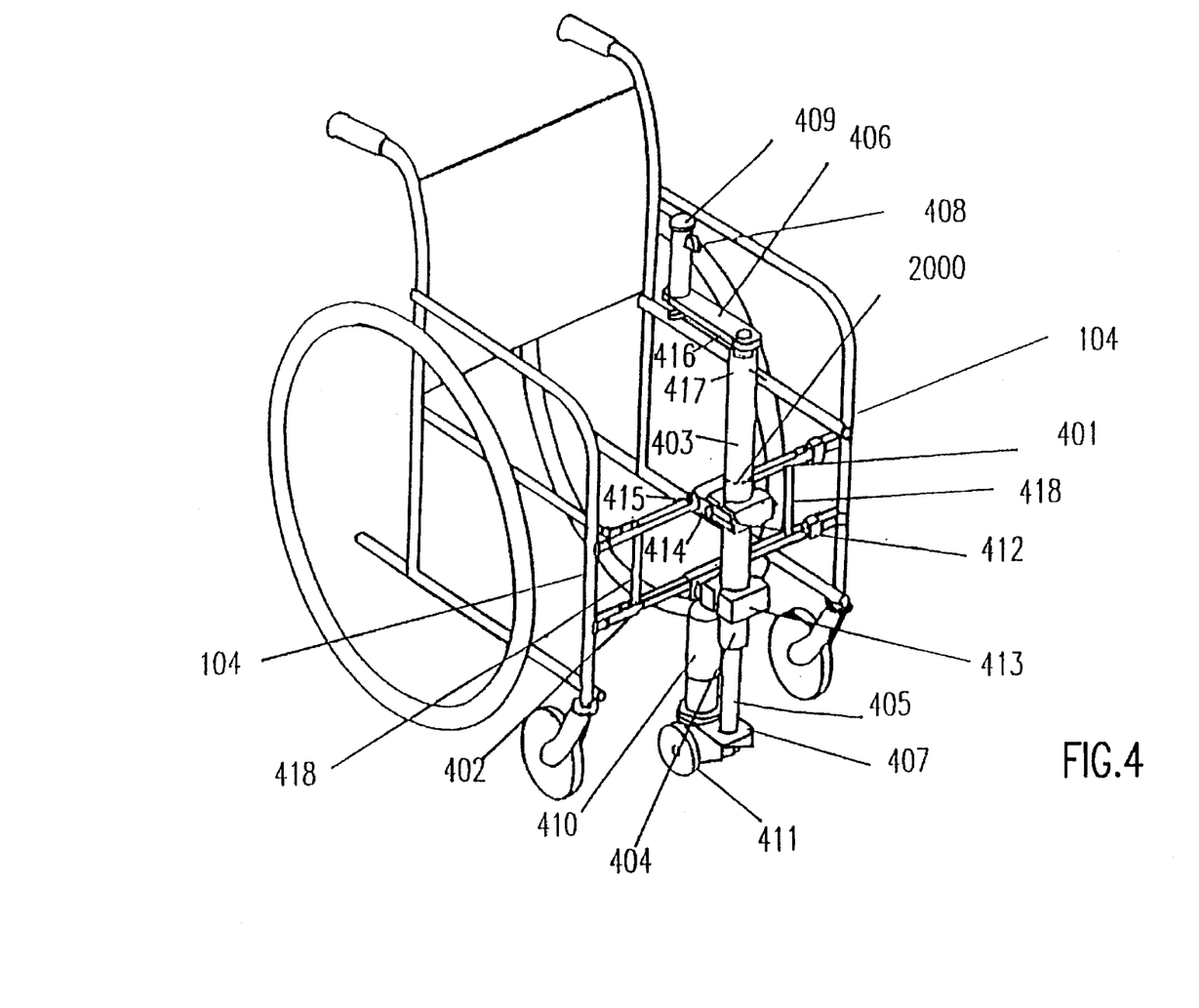
FIG. 4 is a front and side view of the drive attachment for a wheelchair according to a second embodiment of the invention.

As shown in FIG. 4, a securing frame is composed of an upper securing cross-bar 401 and a lower securing cross-bar 402, horizontally connected to the two vertical wheelchair supports 104 located under the front edge of the wheelchair seat. The four points of attachment provide a solid frame which is not prone to rotation as would be a single securing cross-bar. The securing cross-bars 401,402 are not connected together in a single unit so that they can be positioned as needed on different wheelchairs (i.e. the vertical distance between the securing cross-bars 401,402 may be four inches on one chair and 5 inches on another). This two-piece arrangement also simplifies attachment and reduces the weight of the individual components to be lifted into place. Support braces 418 of varying size are used on some wheelchairs for additional structural rigidity, and are separately detachable from cross-bars 401,402 or permanently attached to comprise a single-unit securing frame.

An alternative embodiment has a single securing cross-bar (not shown) to fit a particular size or model of wheelchair. In another alternative embodiment, one or both separate cross-bars 401,402 have a curved or offset section(s) along their length (not shown) to accommodate different sized motors, drivetrains and steering components.

Figure 5:
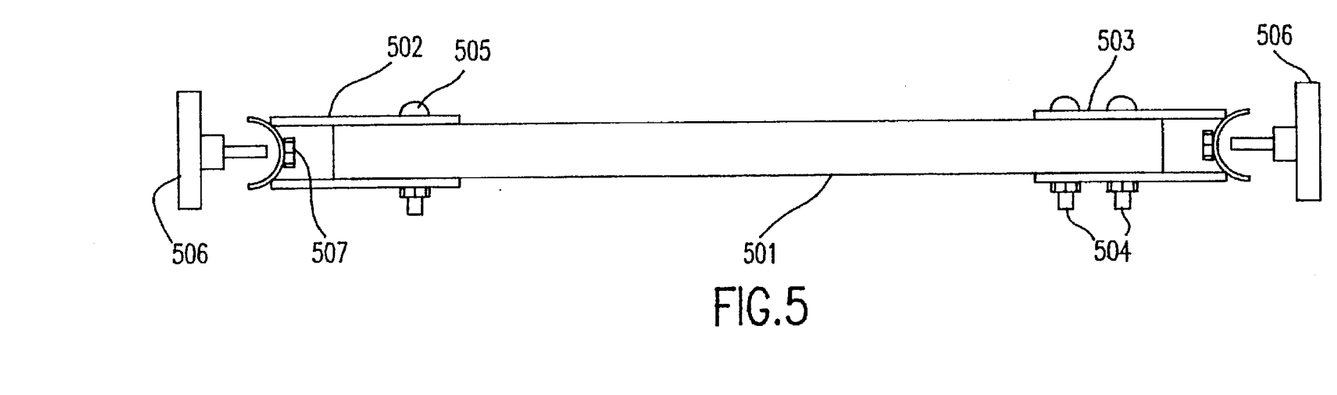
FIG. 5 is a detailed, exploded view of a cross-bar according to the invention.

In FIG. 5, a securing cross-bar is illustrated in greater detail. The securing cross-bar can be adjusted to provide a longer or shorter support depending on the width of the wheelchair. Adjustment is accomplished by bolting the three sections of the securing cross-bar (a long center bar 501 and two end pieces 502 and 503) either closer together or farther apart. At one of the connection points, two bolts 504 are used to secure the end piece to the long center bar 501. The other connection point, however, uses only one bolt 505 to allow rotation between the two sections 502 and 501.

To secure in place, the long center bar 501 is rotated at the rotatable connection 505 and attached to one side of the wheelchair vertical frame members 104. Attachment is achieved by securing a bolt 506 (the head of the bolt is fitted with a hand-turn knob) through a predrilled hole in the wheelchair frame. The bolt extends through the frame and into a nut 507 welded to the end-piece 502. An alternative embodiment has a threaded hole (not shown) tapped into the end-piece 502 for receiving the bolt. The long center bar 501 is then extended into place and the other point of attachment is secured. A stable connection at both ends of the securing cross-bars 401,402 precludes the securing cross-bars 401, 402 from rotating out of position.

Figure 6A:
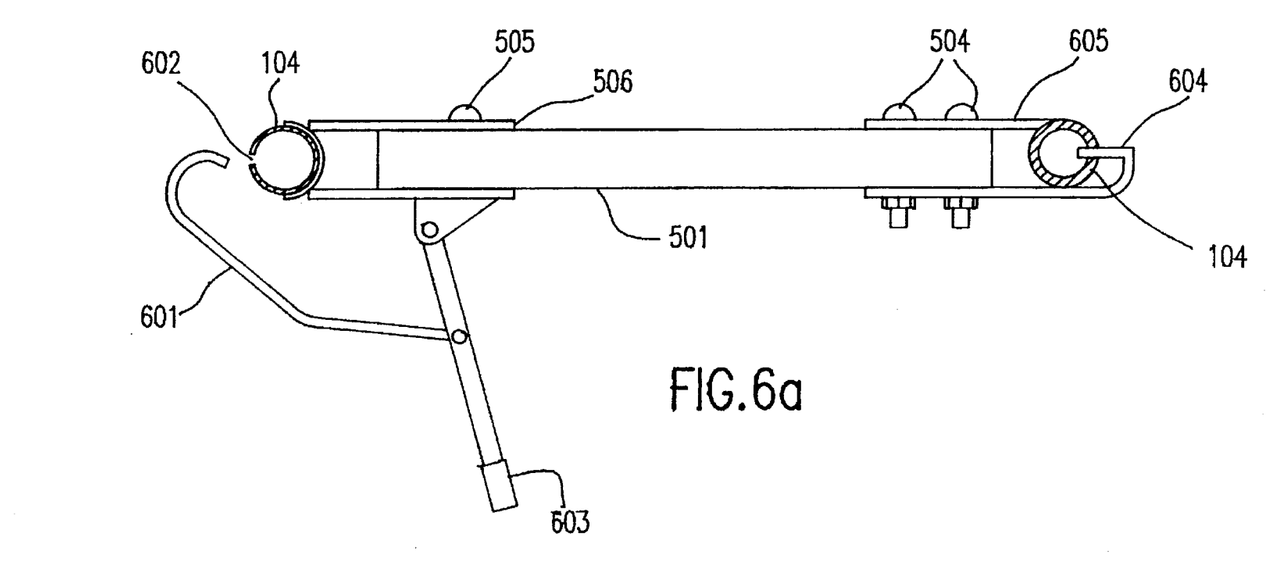
FIGS. 6a and 6b are detailed top views of a cross-bar with one embodiment of quick-connect means according to the invention.
Figure 6B:
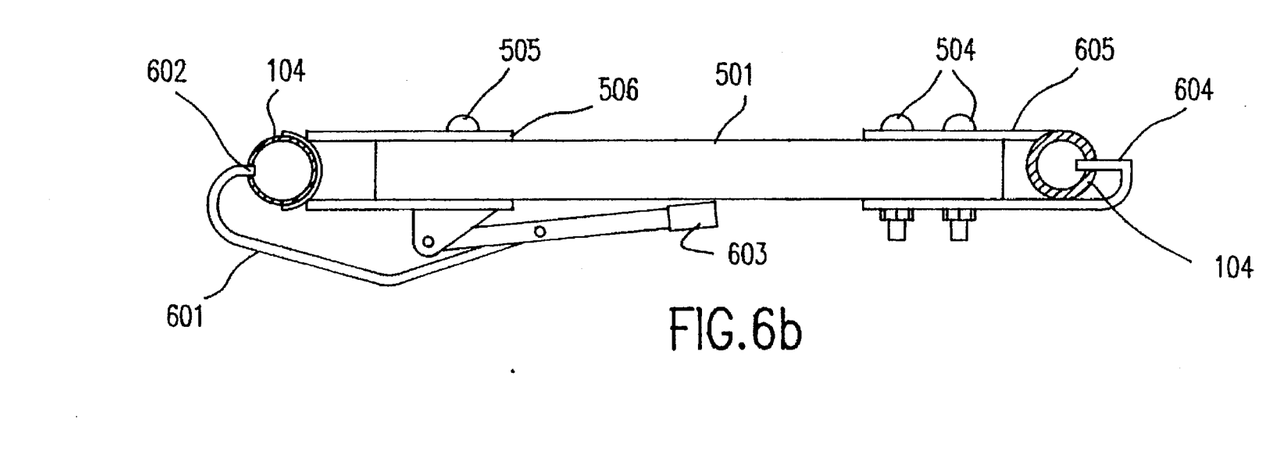

An alternative attachment apparatus for a securing cross-bar, as illustrated in FIG. 6, incorporates a latch mechanism at one end or both ends of the long center section 501. The three main sections of the securing cross-bar (501, 502 and 503) are retained with at least one bolt 505 through modified end-piece 606 and at least one bolt 504 through modified end-piece 605.

In one preferred embodiment of this design, on the first end of securing cross-bars 501, a hook 604 is on the first end of securing cross-bars 501, a hook 604 is welded to or machined as part of modified end-piece 605. To attach, the cross-bar frame is positioned at an angle (of variable size) which is open to the front vertical frame of the wheelchair and the hooks 604 are placed in pre-drilled holes in, or against flanges on, one wheelchair frame upright 104. The cross-bar frame is then rotated about a vertical axis toward the other wheelchair frame upright 104, and the second end of cross-bar(s) 501 is pulled adjacent to the second wheelchair frame upright 104, closing the angle.

Instead of a bolt 506 projecting through the second upright section of the wheelchair frame 104, a hook 601 extends to the lateral outside of the wheelchair frame 104 and inserts into a predrilled hole 602, rests against a flange (not shown) on frame 104 or simply pulls tight around 104 upon closure of latch handle 603. Latch handle 603 is then pulled into a securing position away from the hook 601 end and the connection is stabilized. To release, the latch handle 603 is pulled toward the nearest wheelchair frame upright section 104 (releasing the hook 601) and the cross-bar assembly is rotated out of place. An advantage of this latch mechanism is the ease with which it can be manipulated.

One embodiment utilizes a similar latch mechanism to attach the vertical braces 418 to the cross-bars 501. Another embodiment has the latch mechanism mounted on the vertical braces and attached to the wheelchair frame uprights 104.

Referring again to FIG. 4, the vertical column 403 is the central component of the drive/steer power device. It consists of two concentric tubes 404, 405. Depending upon application, inner "tube" 405 can be a solid rod. The outer tube 404 remains stationary relative to the wheelchair and serves as the connection between the drive/steer components and the securing cross-bars 401,402. Means for attaching and adjusting the outer tube 404 position on the securing cross-bars 401,402 are discussed below.

The inner tube 405 is connected at the top end to the steering bar 406. The lower end of the inner tube 405 is connected to the drivetrain support 407. The inner tube 405 serves as a conduit for the wiring between the finger actuator(s) 408 on the steering handle 409 and the motor 410 located on the drivetrain support 407. When inner tube 405 is a solid rod the wiring will be routed through the outer tube 404 or on the outside of outer tube 404.

While the outer tube 404 is stationary, the inner tube 405 rotates and translates vertically to accommodate steering motions and fluctuations due to uneven driving surfaces. This is achieved by connecting the two tubes 404, 405 with bearings (or other friction-reducing components) to allow motion in both the rotational and vertical directions. Bearings located at the top and at the bottom of the tubes 404, 405 maintain the relative position of the tubes 404, 405.

Figure 7:
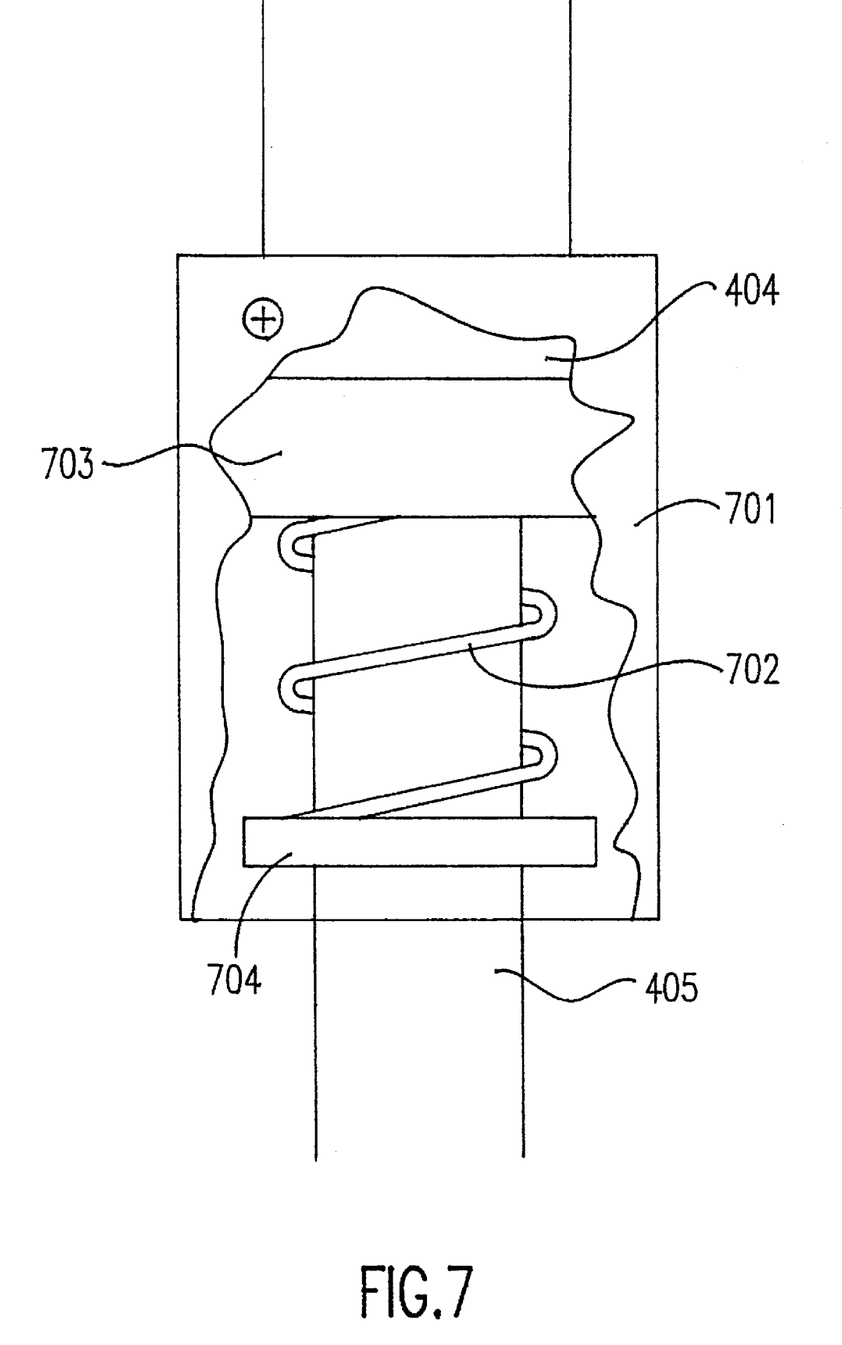
FIG. 7 is a cut-away front view of spring biasing means connecting the first and second sections of the central column according to the invention.

Referring also to FIG. 7, the juncture at the bottom of tubes 404, 405 includes a housing 701, open at its lower end, which provides a downward force on the inner tube 405 by means of a compression spring 702. This spring is compressed against a thrust or similar bearing 703 which is secured to the outer tube 404 and a collar 704 which is secured to the inner tube 405. The result is a constant pushing of the inner tube 405 toward the ground which maintains drive wheel(s) 411 in contact over uneven terrain. This biasing effect is also necessary to provide adequate friction for the drive wheel(s) 411 to propel the wheelchair.

Referring, once again, to FIG. 4, the vertical column 403 attaches to the securing frame in a quick and easy manner. Two points of attachment are used; one at the upper securing cross-bar 401 and one at the lower securing cross-bar 402. Each connection is adjustable up and down the length of the vertical column 403. This is necessary for adjustment to wheelchairs of different dimensions. In order to provide the needed adaptability, a set of blocks 412, 413 (shown in detail in FIG. 9) is used to clamp onto the column. The blocks can be secured onto the column at any position and moved easily, if necessary, by loosening fasteners, such as bolts, which tighten the blocks 412, 413 around the outer tube 404. Clamps of various designs can also be used in place of the blocks to serve the same function. The blocks serve as secure connection areas for the two mechanisms, described below, which attach the vertical column 403 to the cross-bars 401, 402.

Figure 8:
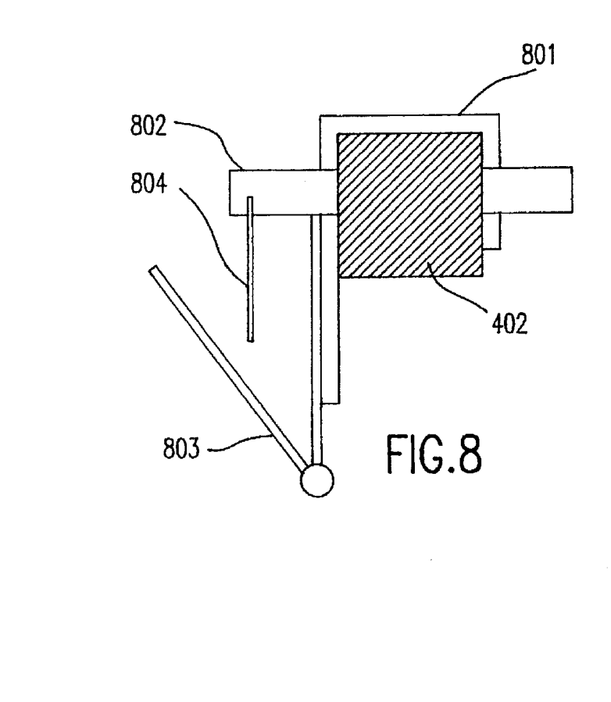
FIG. 8 is a side view of a cross-bar attachment hook and hinge mechanism according to the invention.
Figure 9:
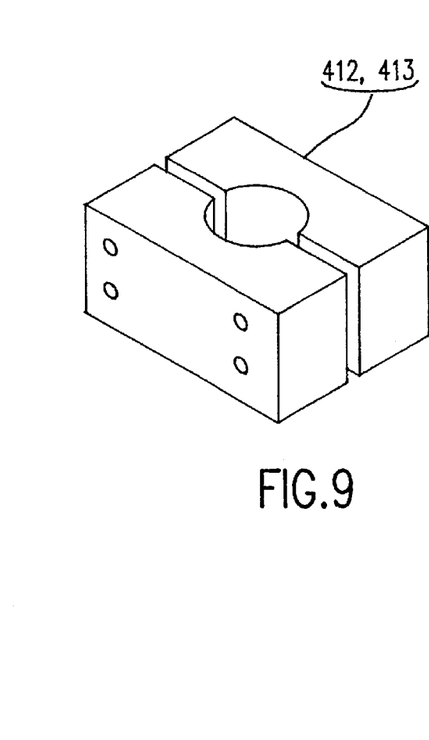
FIG. 9 is a view of a mounting block according to the invention.

As shown in FIG. 8, at the lower securing cross-bar 402, the vertical column 403 hooks into place with a hook 801 that overlaps the lower securing cross-bar 402 bar and is pinned (pins 802 are pushed through alignment holes in the hook 801 and lower securing cross-bar 402) into place. The pins 802 have rings 804 or other finger holds for easy removal and spring-loaded balls (not shown) which prevent the pins 802 from falling out of hook 801. Various other fasteners can be used in place of the pins so as to accommodate the user's capabilities, but still allow easy removal. The hinge 803 is formed of two plates joined at a pin about which the two plates rotate. One of the plates of the hinge is connected (by screws, welding or other suitable means) to the hook 801 and the other plate is connected to the block 413. Therefore, the block 413 (and therefore the vertical colunm 403) can rotate relative to the hook about the pin of the hinge 803.

Figure 10:
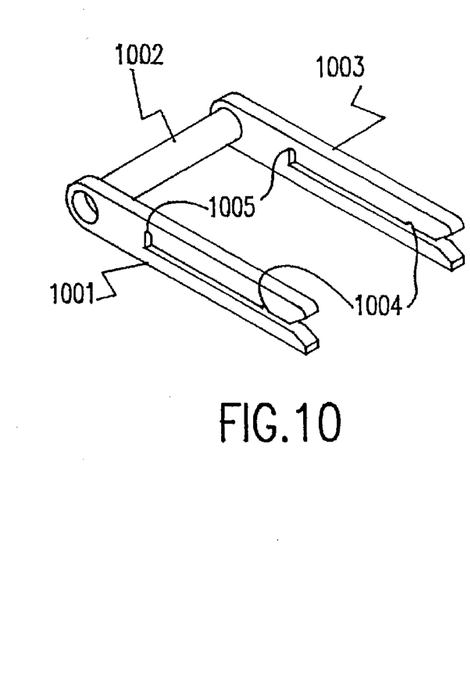
FIG. 10 is a view of the grooved attachment mechanism according to the invention.

At the top cross-bar 401, the vertical colunto 403 is secured with a grooved attachment mechanism 1001 shown in detail in FIG. 10 (that remains attached to the upper securing cross-bar 401) and a bolt or pin 414 which protrudes from each side of the securing block 412 (see FIG. 4). The grooved attachment mechanism 1001 includes a tube section 1002 which freely rotates about the upper cross-bar 401, and two protruding flat sections 1003. The position of the mechanism on the securing cross-bar is maintained by two small pins or rings 415 protruding from the upper cross-bar 401 on either side of the grooved attachment mechanism 1001.

The flat sections 1003 extend along the sides of the block 412. Each flat section 1003 has a groove for the bolt 414 to slide into and the groove additionally has at least two notches 1004, 1005, or indents, into which the bolt 414 can slide (one notch provides a power position and another the manual position). A knurled thumbscrew or other quick-adjust means is used to secure the bolt 414 and hold the grooved attachment mechanism against the block 412 with friction. The bolt 414 passes through the block 412 and both flat sections of the mechanism. The bolt 414 remains attached to the block 412 when the block and vertical tube 403 are moved away from the upper securing cross bar 401.

Figures 12A, 12B:
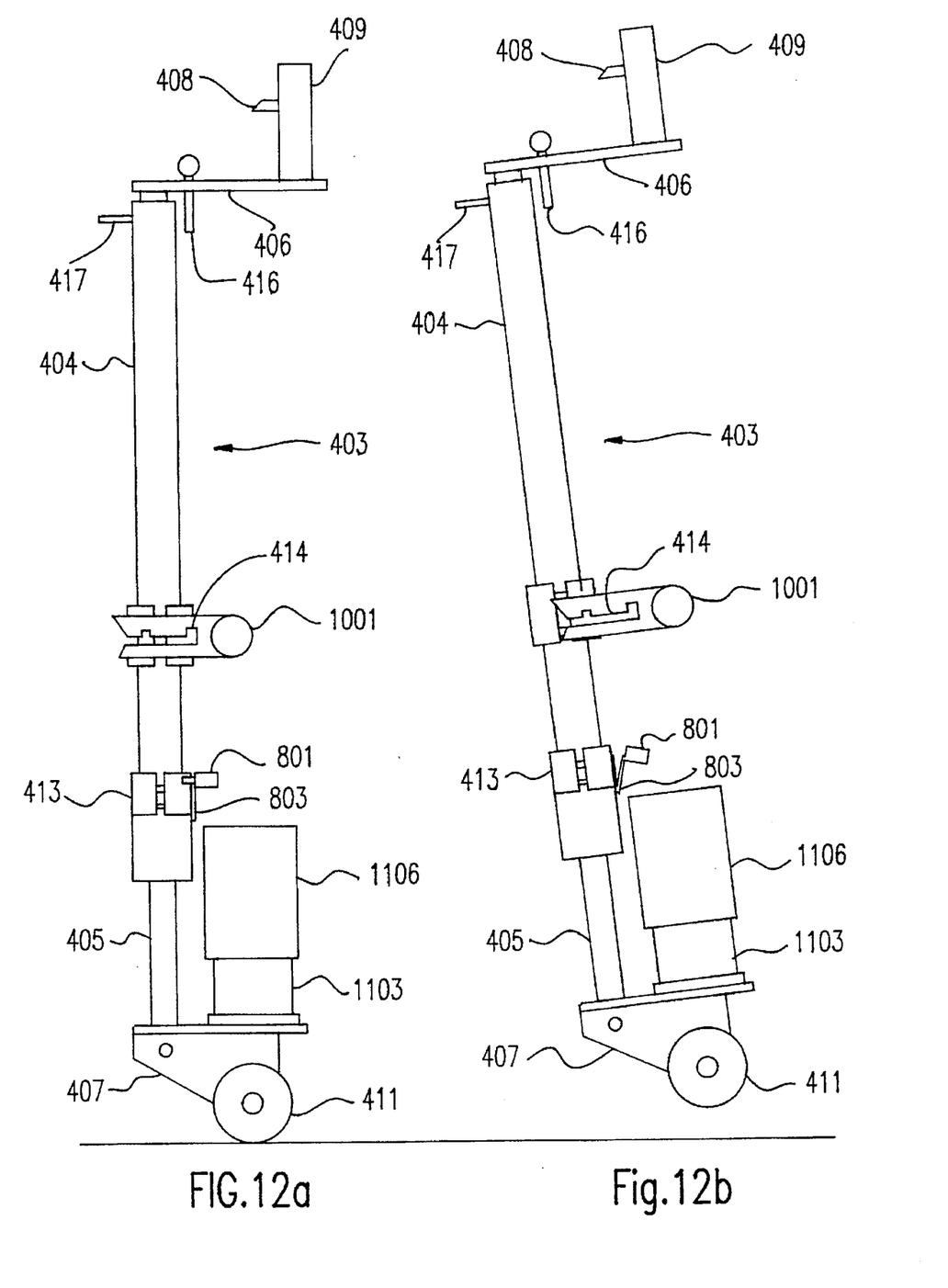
FIGS. 12a and 12b are side views of the attachment according to the invention showing the attachment in contact with the ground and raised from the ground.

Manual and power driving modes are achieved by rotating the vertical column 403 so that the bolt 414 rests in one of the two sets (or more) of notches 1004, 1005. The first position, where bolt 414 rests in notches 1005 and the drive wheels are in constant contact with the ground, is for the power operating mode. In this configuration the vertical column 403 is approximately perpendicular to the ground as shown in FIG. 12A. The second position, where bolt 414 rests in notches 1004 and which rotates the drive wheels off the ground, provides for the manual driving mode. This is accomplished at the top securing cross-bar connection where the vertical column 403 is pushed forward into the second position (i.e. notches 1004). The entire vertical column 403 rotates about the hinge 803 at the hook connection of the lower securing cross-bar shown in FIG. 8. As shown in FIG. 12B, this action lifts the driving wheels off the ground.

An alternative embodiment has additional notches (not shown) in the flat sections 1003 of attachment mechanism 1001 for allowing varying levels of contact between the ground and the drive wheels and allowing the wheels to be at various levels above the ground, depending upon the specific user's needs.

The vertical column 403 can also be rotated into a third position by separating the grooved attachment mechanism 1001 from the vertical colunto 403 and block 412. In this position, the vertical column 403 comes to rest at a forward angle of approximately 40 to 80 degrees (depending upon the specific wheelchair and attachment size relationship) from the vertical. The vertical column 403 stops rotating about the hinge 803 when the drive wheels or other colunto components meet the crossed wheelchair supports or other points of interference under the seat. This action moves the steering apparatus and vertical column 403 out of the way to provide access for the wheelchair underneath tables and counters. This full forward location of the vertical column 403 also allows an operator with sufficient capabilities to transfer in and out of the wheelchair while the power drive/steer attachment is in place.

In an alternative embodiment, as described in the first embodiment above and shown in FIG. 4, column 403 separates in two sections with the division point above the upper cross-bar 401 and depicted as a dashed line 2000. This allows easy ingress/egress to/from the wheelchair seat and allows the wheelchair to be rolled partially under a table or desk top.

Referring again to FIG. 4, a steering bar 406, oriented approximately perpendicular to the vertical column 403, extends back toward the wheelchair operator. The steering bar is attached to the inner tube 405 of the vertical column 403 by means of a dowel, or other suitable attachment means such as bolts, bonding, welding, etc. and is used to rotate the entire drive wheel apparatus (attached at the lower end of the inner tube 405). A vertical handle 409 which spins on a vertical axle or bearing (not shown) is connected to the end of the steering bar 406 for the operator to maneuver the position of the steering bar 406. A finger actuator(s) 408 which controls voltage to the motor, on/off positions, and forward/reverse positions, is placed on the vertical handle 409 and/or the steering bar 406 or in other close proximity to the operators hands. Steering is accomplished by rotating the steering bar 406 counterclockwise for motion to the left and clockwise for motion to the right. The handle 409 easily spins in place so that the user does not need to regrip the handle at different positions.

As with the first embodiment, the vertical inner tube 405 can be rotated in any direction which allows superior mobility, especially in tight areas. Pin 416 is inserted through a hole in the steering bar 406. Pin 416 contacts a projection 417 when the steering bar is rotated to the completely forward position. Projection 417 extends from the upper portion of outer tube 404 and can be any device that will contact pin 416 such as a fixed pin, a bolt, a screw, a flange or an extension of outer tube 404. Thus, pin 416 contacting projection 417 prevents the steering bar 406 (and the inner tube 405) from being rotated more than one complete circle (360°). By preventing more than one rotation of the inner tube 405, the wiring running from the finger actuator(s) 408 to the motor 410 does not become tangled or wound around the vertical column 403, however; full directional mobility is maintained. Pin 416 is removable to allow the user to complete excessive rotation, if desired. Pin 416 could be permanently fixed in position, if desired, or deleted if the wiring routing allows.

In an alternative embodiment (not shown) the foregoing pin located vertically and the front of a third block (not shown) located just beneath the steering bar 406 on outer tube 404. The foregoing pin contacts the bar 406 and stops rotation of the inner tube 405 when the steering bar 406 is positioned opposite the operator.

Grooves are cut on the underside of the steering bar 406 to accommodate the wiring for the finger actuator(s) 408 which pass from the handle to the inner tube 405 of the vertical column 403. A conduit wire-routing (not shown) is used in the place of the open groove to accommodate specific situations. A transistor attached to the wires and the steering bar 406 transfers any excessive heat to the bar (the steering bar functions as a heat sink for the motor system).

One alternative to the steering bar 406 and vertical handle 409 is a forked swivel post, shown in FIG. 13, for operators who have more limited hand-gripping capabilities. For example, this arrangement may be appropriate for someone with a low level quadriplegia injury. The user can place the wrist or the palm of a hand vertically into the fork and maneuver the wheelchair by means of gross arm motions. A voltage control button placed in the valley of the fork (actuated by a downward force) can be used to control speed. Different embodiments have specialized manual motor controls (not shown) that are adapted to accommodate different user capabilities.

An additional steering alternative, shown in FIG. 3, is a steering wheel 30 attached directly above the inner tube 405 of the vertical column 403. This configuration can also serve as a stabilizing handle for operators who need assistance maintaining their posture in the wheelchair. The wheel can be gripped with two hands simultaneously and, while it rotates, it will not translate to a different location.

Figure 11:
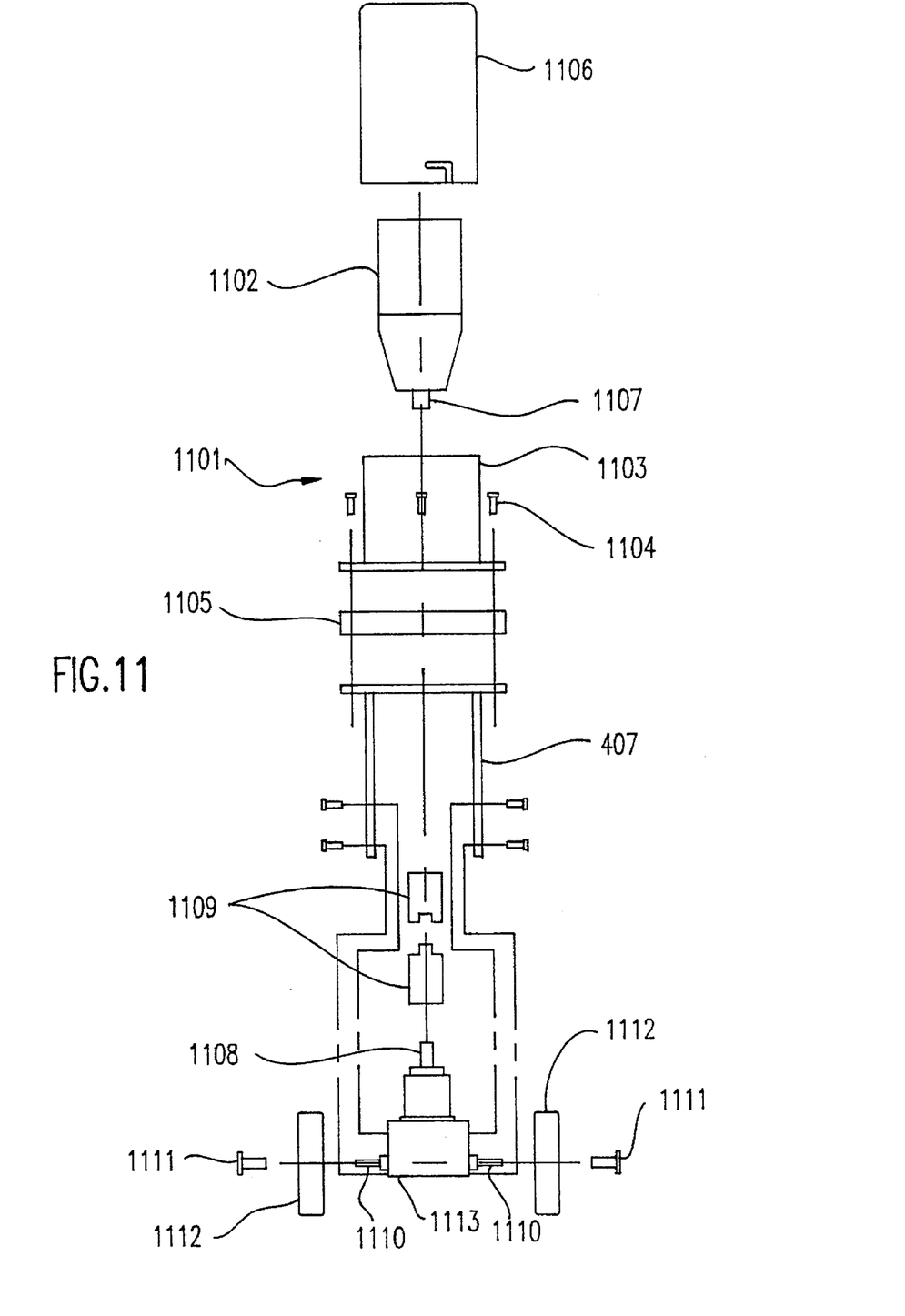
FIG. 11 is an exploded front view of the central column according to the invention.

FIG. 11 is an exploded, two-dimensional view of the drivetrain assembly 1101. The drivetrain support 407 serves as the central support piece for the drivetrain assembly 1101 and it is connected directly to the inner tube 405 of the vertical column 403. The entire drivetrain assembly rotates in conjunction with the inner tube 405 of the vertical column 403 as the operator maneuvers the steering bar 406.

In order to provide sufficient space for the wheelchair casters to rotate, a compact, electric motor 1102 is oriented parallel to the vertical column 403. Such a motor is well known in the art and will not be discussed in detail for sake of brevity. The motor 1102 is available from a number of manufacturers and should have characteristics such as a compact power source (e.g., a single 12-volt battery) and small dimensions. Additional desirable features include adjustable torque levels, adjustable speed and reversibility. A motor used in a heavy-duty cordless hand-held drill, for example, is an excellent motive source for this purpose.

A casing 1103 for the motor 1102 secures it onto the drivetrain support 407 with screws 1104 (or rivets, bonding, etc.) which pass through a stabilizing spacer 1105. Spacer 1105 has a wide, solid base that maintains the vertical alignment of the casing 1103. The casing 1103 includes machined grooves or other alignment means on the inside surface which interlock with the motor 1102 to restrain the motor as it rams. Reaction forces would otherwise cause the entire motor to rotate while the shaft is mining. A plastic, or other lightweight material, cover 1106 fits on top of the casing 1104 to protect the motor 1102. A hole drilled in the side of the cover 1106 permits the control wires to reach the motor leads. Certain varieties of motors have integral casings and covers so that casing 1103 and/or plastic cover 1106 are not necessary when these motors are used.

The motor shaft 1107 extends downward into the drivetrain support 407 and is coupled to a gearbox input shaft 1108 via a two-piece coupling 1109 or other similar means of connection. The details of the gearbox 1113 are well known to one ordinarily skilled in the art and will not be discussed herein for sake of brevity. Two output shafts 1110 from the gearbox 1113 extend beyond both sides of the drivetrain support 407. Each of the shafts is fitted with a bushing or bearing and key 1111 to drive the two drive wheels 1112. Alternative fasteners to the key, such as a splined output shaft and mating wheel are used, depending upon specific application.

As discussed above with respect to the first embodiment, a single drive wheel or multiple drive wheels may be used. The drive wheel(s) may be formed from a variety of substances such as rubber or hard or soft plastics and may be solid, semi-pneumatic or pneumatic. The drive wheel(s) can have a variety of tread designs (or no tread, i.e. flat) depending upon the primary surface that the wheelchair will be encountering. Additionally, the drive wheel is located in trailing arm configuration, afforded by drivetrain support 407. The trailing arm allows the drive wheel(s) to maintain a positive caster orientation with respect to the direction of the wheelchair. The positive caster provides a number of benefits, including increasing steering stability and a tendency to self-center (or steer in a straight line). On some wheelchairs, clearances do not allow the possibility of positive caster, for those wheelchairs the drivetrain assembly is centered under column 404.

The battery which provides power to the motor must be carried on the wheelchair in addition to the drive/steer apparatus. It is secured in a battery box of plastic or other lightweight material with plugs in the side of the box for connecting the battery leads to the control wires. Battery terminal spring clips are used in lieu of the box-mounted plugs, depending on the specific application. The battery box is placed onto a tray which rests either in front of or behind the cross-bar central wheelchair frame support. The tray straddles the lower wheelchair horizontal supports and can be easily removed by unscrewing the securing bolts (thumbscrews can be used as nuts for the screws for quick detachment). On some wheelchairs the battery tray is placed on the lower chair frame, resting against wheelchair frame members to preclude movement, and no bolts are necessary. The battery tray is available in different sizes or is adjustable for wheelchairs of different sizes.

Once the tray is secured to the chair, the battery is positioned on the tray and strapped into place. Wires from the motor controls are then plugged into the box (or clipped to the battery) and the unit is ready to drive. The new power drive/steer design of one embodiment requires only one 12 Volt battery as opposed to the two batteries required for other similar attachments. However multiple batteries can be used, depending upon the specific user's needs. Use of a single battery is a significant advantage because of the weight of the batteries (generally over 25 pounds) and difficulty of handling. Further, a wheelchair user can simply purchase two batteries for the new invention and charge one while the other is in use. This provides a constantly available energy source for this design and avoids the down time associated with charging dual batteries.

The ideal scenario for operation involves a wheelchair user independently able to transfer to and from an automobile with their wheelchair and power drive/steer attachment. This situation is possible for those operators with sufficient upper body capabilities. However, an attendant may easily accomplish the attachment and detachment sequences for a wheelchair user with more limited capabilities.

The attachment sequence begins when the operator removes the wheelchair from the rear seat of an automobile (or other storage area) and completely unfolds the chair. The following steps are then taken to secure the power drive/ steer attachment in place:

the battery tray is secured onto the wheelchair frame and tightened with thumbscrews, if fasteners are needed the battery box (with the battery inside) is positioned onto the tray and strapped into place the securing cross-bars 401,402 are snapped into position on the wheelchair frame and tightened with hand-turn knobs or, alternatively, a hook latch mechanism 601, 603 is used to attach the cross-bars the operator can then lift the main vertical column 403 unit out of the car and hook it, using hook 801, onto the lower securing cross-bar 402 pins 802 are then pushed through the hook 801 and lower securing cross-bar 402 to lock the vertical column 403 in place, leaving it in the tilted fully forward position the plugs from the control wires are plugged into the battery box or the spring clips are attached to the battery the operator can then put the far armrest and both footrests onto the wheelchair and transfer into the seat (because the vertical column 403 is tilted forward and not in the way— note: on some wheelchairs the armrests are fixed and cannot be removed, on this type, the operator must transfer around the armrest)

the operator lifts one leg over the vertical column 403 into place on the far footrest the remaining armrest, if removed, is put into place and finally the vertical column 403 is pulled back toward the operator into the grooved attachment mechanism 1001 and secured into the manual 1004 or power 1005 position with a thumbscrew on bolt or pin 414. This sequence can also be performed if the operator transfers to the chair before the securing cross-bars 401,402 and vertical column 403 unit are locked into place. To remove the attachment, the above sequence is reversed and the components are placed on the floorboard or in the passenger seat of the automobile (or other storage location).

While the invention has been described in terms of a single preferred embodiment with several options, those skilled in the art will recognize that the invention can be practiced with modification within the spirit and scope of the appended claims.

Having thus described my invention, what I claim as new and desire to secure by letters patent is as follows:

1. A power drive/steer assist attachment for a wheelchair, comprising:
    a frame connectable to said wheelchair including spaced apart first and second horizontal members;
    means for securing said first and second horizontal members of said frame to said wheelchair with said first, horizontal member positioned above said second horizontal member;
    a steering column connected to said frame;
    a drive wheel connected to said steering column; and
    means for rotating said steering column about a horizontal axis using said second horizontal member of said frame as a center of rotation to alternatively position and hold in place said drive wheel connected, to said steering column in a ground engaging position where said drive wheel engages the ground and in at least one non-ground engaging position where said drive wheel does not engage the ground.

2. The power drive/steer assist attachment of claim 1 wherein said means for rotating comprises
    a hinge connected to said second horizontal member and said steering column, said steering column rotating about said second horizontal member by pivoting at said hinge; and
    an attachment mechanism secured to said first horizontal member for releasably attaching said steering column to said first horizontal member.

3. The power drive/steer assist attachment of claim 2 wherein said attachment mechanism includes a plurality of notches for releasably attaching said steering column to said first horizontal member at a plurality of different orientations relative to said frame.

4. The power drive/steer assist attachment of claim 1 further comprising a steering mechanism connected to said steering column for rotating said steering column about a vertical axis up to 360°.

5. The power drive/steer assist attachment of claim 4 further comprising a means for preventing the rotation of said steering column about a vertical axis by more than 360°.

6. The power drive/steer assist attachment of claim 4 wherein said steering mechanism is selected from the group consisting of a handlebar, a tiller, a forked swivel post, and a steering wheel.

7. The power drive/steer assist attachment of claim 1 further comprising:
    a motor connected to said drive wheel; and
    means for selectively providing power to said motor to drive said drive wheel.

8. The power drive/steer assist attachment of claim 1 wherein said drive wheel is offset behind said steering column.

9. The power drive/steer assist attachment of claim 1 wherein said first and second horizontal members are parallel, and said steering column is perpendicular to said first and second horizontal members.

10. The power drive/steer assist attachment of claim 1 wherein said frame is removable from said means for securing.

11. The power drive/steer assist attachment of claim 1 wherein said steering column is comprised of top and bottom separable pieces, wherein said top piece is separable from said bottom piece while said bottom piece of said steering column remains attached to said frame.

12. The power drive/steer assist attachment of claim 1 further comprising a means for applying a downward force to said drive wheel.

13. A power drive/steer assist attachment for a wheelchair, comprising:
    a frame connectable to said wheelchair including spaced apart first and second horizontal members;
    means for securing said first and second horizontal members of said frame to said wheelchair with said first horizontal member positioned above said second horizontal member;
    a steering column connected to said frame;
    a drive wheel connected to said steering column; and
    means for rotating said steering column about a horizontal axis using said second horizontal member of said frame as a center of rotation; and
    a mechanism for maintaining said steering column in a plurality of positions at least one of which is a ground engaging position where said drive wheel engages the ground and another of which is a non-ground engaging position where said drive wheel does not engage the ground.

14. The power drive/steer assist attachment of claim 13 wherein said mechanism can alternatively maintain said steering column in at least one ground engaging position and a first and a second non-ground engaging position.

15. A power drive/steer assist attachment for a wheelchair, comprising:
    a frame connectable to said wheelchair;
    means for securing said frame to said wheelchair;

a steering column connected to said frame;

a drive wheel connected to said steering column; and means for rotating said steering column about a horizontal axis to alternatively position and hold in place said drive wheel connected to said steering column in a ground engaging position where said drive wheel engages the ground and in at least one non-ground engaging position where said drive wheel does not engage the ground.

16. A power drive/steer assist attachment for a wheelchair, comprising:

a frame connectable to said wheelchair;

means for securing said frame to said wheelchair;

a steering column connected to said frame;

a drive wheel connected to said steering column; and means for rotating said steering column about a horizontal axis; and a mechanism for maintaining said steering column in a plurality of positions at least one of which is a ground engaging position where said drive wheel engages the ground and another of which is a non-ground engaging position where said drive wheel does not engage the ground.

17. The power drive/steer assist attachment of claim 16 wherein said mechanism can alternatively maintain said steering column in at least one ground engaging position and a first and a second non-ground engaging position.

* * * * *